United States Patent [19] [11] 4,070,223
Stalzer [45] Jan. 24, 1978

[54] APPARATUS AND METHOD FOR INTRODUCING CONNECTED FORMS INTO AN ASSOCIATED DEVICE

[76] Inventor: Edwin Stalzer, 69-39 Trotting Course Lane, Rego Park, N.Y. 11374

[21] Appl. No.: 632,270

[22] Filed: Nov. 17, 1975

[51] Int. Cl.[2] ........................ B32B 3/10; B32B 31/06; B65D 85/671

[52] U.S. Cl. .................................... 156/264; 156/289; 156/510; 206/390; 206/409; 206/411; 206/813; 206/820; 226/6; 282/15 B; 282/DIG. 2; 428/40; 428/43; 428/131; 428/137

[58] Field of Search ............... 156/157, 502, 544, 505, 156/506, 510, 527, 256, 289, 513, 264; 282/20 B, 15 B, 16 B, 16 C, 18 A, DIG. 2; 229/69, 17 S; 206/390, 395, 396, 409, 411, 813, 820; 242/58.5; 226/92, 77, 6; 428/40, 43, 131, 137

[56] References Cited

U.S. PATENT DOCUMENTS

| | | | |
|---|---|---|---|
| 1,843,771 | 2/1932 | Kline | 206/390 X |
| 2,013,844 | 9/1935 | Sherman | 229/69 |
| 2,373,092 | 4/1945 | Avery | 206/390 X |
| 2,764,501 | 9/1956 | Perri | 206/390 X |
| 2,900,868 | 8/1959 | Gaffney, Jr. | 156/157 |
| 3,136,679 | 6/1964 | Bender | 156/505 |
| 3,327,927 | 6/1967 | Allison et al. | 229/69 |

*Primary Examiner*—William A. Powell
*Assistant Examiner*—M. G. Wityshyn
*Attorney, Agent, or Firm*—McAulay, Fields, Fisher & Goldstein

[57] ABSTRACT

The apparatus and method of the present invention is adapted to be utilized with respect to packages of connected forms of the type having sprocket holes along the margins thereof which are adapted to be engaged by sprocket wheels in, for example, a print-out device for advancing the forms to an operating station in the device. The method comprises providing a strip having sprocket holes therein. The spacing of the sprocket holes on the strip is equal to the spacing of the sprocket holes on the forms. The strip is connected to the first form of the package with the sprocket holes in the strip in alignment with the sprocket holes in the margin. The strip or strips are then engaged with the sprocket wheels in the device which is then operated to advance the package of forms into the device.

13 Claims, 7 Drawing Figures

APPARATUS AND METHOD FOR INTRODUCING CONNECTED FORMS INTO AN ASSOCIATED DEVICE

The present invention relates generally to an apparatus and a method for introducing packages of connected forms into an associated device and, more particularly, pertains to a method and an apparatus that permit forms to be moved to an operating station in a device without destroying any forms.

Many business machines presently in use utilize so-called multiform units or multilayer forms which comprise a number of layers of the same form which are connected to similar forms along a tear line. For example, a great many industries have automated billing procedures wherein such multilayer forms are introduced into a print-out device and the data is then recorded on the forms under the control of a computer or the like. Thereafter, each form is separated from the other forms and the various layers comprising a form are similarly separated. The layers are then distributed to the various departments involved in the billing procedures such as bookkeeping, inventory control, etc. In order to increase the versatility of such machines, the machines have been designed to operate on a number of different types of forms. Thus, for example, one machine may be utilized to print-out data on billing forms as well as for printing out data on checks.

However, a major problem is encountered when the type of form introduced into the machine or device is changed. To be more specific, the forms in a package of forms are numbered in sequence. When a billing run has been completed on a machine, only a portion of a package of billing forms may have been utilized. When the machine is again used for billing purposes, the next form in numerical sequence is introduced into the machine. However, in order to introduce the package of forms into the print-out device a sufficient distance for alignment purposes and the like, the first form will normally have to be moved beyond the printing station. As a result, the first form is not utilized. Therefore, a record must be kept of the numbered form so that the same can be voided. This problem is compounded to a greater degree when it is realized that the same problems are encountered in introducing checks into the print-out device. In practice, it has been found that the first three checks in a series must be voided since the first three checks will have been moved beyond the printing station when the forms are introduced into the device.

It will therefore be obvious from a consideration of the above, that a great deal of time and money is wasted each time the type of form utilized in the associated device is changed. More particularly, not only is there a tremendous waste of materials as a result of the voided forms, but the labor involved in keeping records of the numbers of the voided forms is also quite considerable.

Accordingly, an object of the present invention is to provide an improved method for introducing forms into an associated device.

A more specific object of this aspect of the invention is to provide a method which simply and efficiently introduces forms into an associated device to permit advancement of the forms to an operating station.

A further object of this aspect of the invention is to provide a method for introducing forms into an associated device that preserves the first form so that it can be utilized for information purposes.

Accordingly, a method performed in accordance with the present invention is utilized for introducing connected multiform units of the type having spaced indexing holes into a device of the type having indexing means for advancing the units to an operating station in the device. The method comprises the steps of providing at least a lead strip with indexing holes having the same spacing as the indexing holes in the units. At least a portion of the strip is superimposed on the first of the units with the indexing holes in the strip in alignment with the indexing holes in the first unit. The strip is connected to the first unit so that movement of the strip causes movement of the units. Accordingly, when the strip is engaged with the indexing means the strip serves as a leader to move the first unit to the operating station thereby eliminating the necessity for destroying or voiding the first unit.

A further object of the present invention is to provide an apparatus for causing movement of the first form of a package of connected multilayer forms to an operating station in an associated device.

A more specific object of this aspect of the invention is to provide apparatus which is easily and quickly connected to the first form of a package of interconnected forms to permit movement of the first form to an operating station.

A further object of this aspect of the invention resides in the novel details of construction that provide an apparatus of the type described which is reliable in operation.

Accordingly, an apparatus constructed in accordance with the present invention is utilized for introducing a package of connected forms into a device wherein the forms are of the type having indexing holes engageable with sprocket wheels for advancing the forms to an operating station. The apparatus comprises at least a strip having indexing holes therein. The spacing between the strip indexing holes is equal to the spacing between the indexing holes in the form. The strip indexing holes are sized to be engaged by the sprocket wheels. Additionally, connecting means is provided on the the strip for connecting the strip to the first form in the package of forms.

Other features and advantages of the present invention will become more apparent from a consideration of the following detailed description when taken in conjunction with the accompanying drawings, in which.

Figures 1, 2, 3:
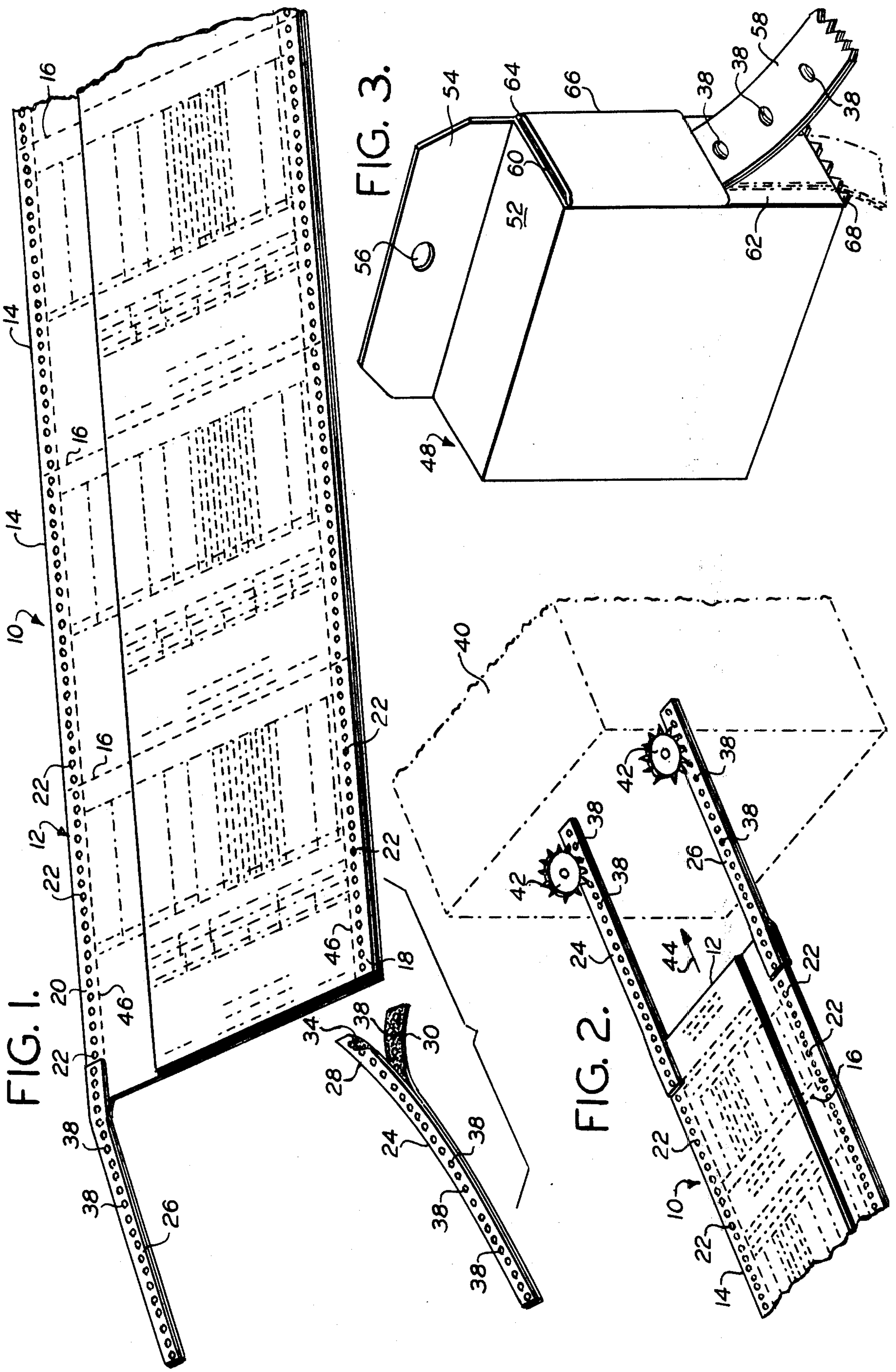
FIG. 1 is a perspective view, partially exploded, illustrating the strips constructed according to the present invention as utilized in connection with multiform units.
FIG. 2 is a perspective view in diagrammatic form illustrating the operation of the apparatus of the present invention to introduce multiform units into an associated device.
FIG. 3 is a perspective view of a dispenser forming a part of the apparatus of the present invention.

As noted hereinabove, the present invention is adapted to be utilized in connection with a package of connected multiform units for introducing the units into an associated machine. Such units, for example, are shown and described in U.S. Pat. No. 2,306,900, issued in the name of A. H. Phillips et al. on Dec. 29, 1942, entitled MULTIFORM RECORD ASSEMBLY. More specifically, a portion of such package of units or multilayer forms is designated generally by the reference character 10 in FIG. 1 and comprises a first or a lead unit 12 and succeeding units 14. Immediately adjacent units are adapted to be separated from each other along a tear line 16. The face of each unit is divided into respective lines and columns, as indicated by the phantom lines in FIG. 1, which receive appropriate data therein. As noted in above identified patent, such units contain a number of different layers so that the information imprinted on the top most layer is simultaneously imprinted on the remaining layers comprising a unit via carbon paper or the like interleaved between the layers. The longitudinal margins 18 and 20 are provided with spaced sprocket holes 22. As noted in greater detail below, the sprocket holes 22 are adapted to be engaged by appropriate sprocket wheels in an associated device such as print-out machine for advancing the units to a printing or operating station in the machine. For bookkeeping purposes, the units, which may comprise, for example, invoices or checks or the like, are preprinted with a sequential numbering system.

When the units are introduced into a machine which prints out the required information on the units, a sufficient lead length is required to enter the units into the machine and align the units so that the information is printed in the correct area of the unit. As a result of this requirement, in practice it has been found that at least the first numbered unit of invoice forms and at least three units of check forms are advanced beyond the printing station thereby requiring these forms or units to be voided with consequent loss of the forms. Additionally, records must be maintained of the numbered voided forms for bookkeeping purposes. However, the present invention eliminates the need to void forms and, therefore, not only eliminates the loss of forms but also eliminates the costly recording of voided forms.

Figure 5:
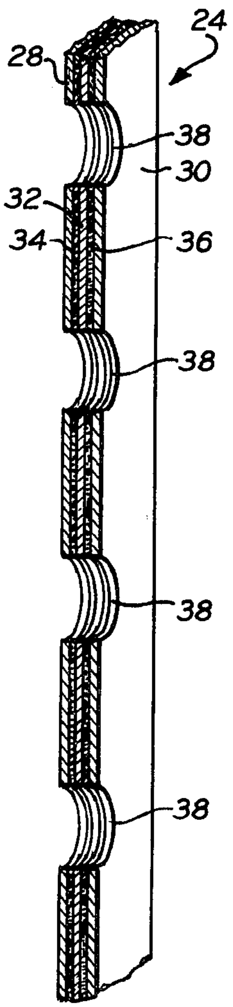
FIG. 5 is a vertical sectional view of one type of strip forming the apparatus of the present invention.

More specifically, two identical strips 24 and 26 are provided which are adapted to be connected to the margins of the first unit 12 and which function as leaders to lead the unit 12 into the associated device. The strip 24 is shown in FIG. 5 and comprises an upper layer 28, a lower layer 30 and an intermediate layer 32. Provided on the inner surfaces of the layers 28 and 30 are layers of a connecting substance such as pressure-sensitive adhesive layers 34 and 36, respectively. The layers 28 and 30 may be fabricated from a strong and flexible paper whereas the intermediate layer 32 may be fabricated from wax paper or the like so that the layers 28 and 30 may be easily separated from the layer 32. That is, the pressure-sensitive adhesive and the intermediate layer 32 are selected so that there will be no interaction between the adhesive and the intermediate layer. More specifically, when a layer such as the layer 38 is separated from the intermediate layer, the layer of adhesive 34 will remain on the layer 28. Additionally, the strip 24 is provided with spaced sprocket holes 38 which have the same spacing as the sprocket holes 22 in the margins 18 and 20 of the units or forms. As noted above, the strip 26 is identical in construction to the strip 24.

In operation, the layers 28 and 30 and, therefore, the associated adhesive layers, are separated from the intermediate layer 32 for a distance of approximately four or five sprocket holes. In other words, the layers are separated along a small portion of the length of the strip. The intermediate layer 32 is removed from this portion. The layer 30 is then positioned below the lower surface of the first unit 12 of the package 10 and, simultaneously, the upper layer 28 of the separated portion is positioned over the upper surface of the unit 12. The sprocket holes 38 in the strip 24 are aligned both vertically and horizontally with the sprocket holes 22 in the margin 18 of the form. Pressure is then applied to the outer surfaces of the layers 28 and 30 to cause the layers to adhere to the unit. Similar comments apply to the strip 26 which is connected to the margin 20, as shown in FIG. 1.

The strips 24 and 26 are then introduced into the print-out device or machine shown by the phantom line drawing of FIG. 2 and designated generally by the reference character 40. As noted above, the device 40 is provided with sprocket wheels 42 which engage in the sprocket holes 38 in the strips 24 and 26. Thereafter, the sprocket wheels 42 are operated to cause the first form 12 to advance in the direction shown by the arrowhead 44 to the operating station (not shown) in the device 40. The strips 24 and 26 are selected to have a sufficient length so that no part of the form 12 need be advanced beyond the printing or operating station when introducing the first form 12 into the device 40. As a result, no forms are wasted and, more importantly, the maintenance of bookkeeping records for voided forms is eliminated.

After the units have been operated upon by the machine 40, as is conventional, they are separated along their tear line 16. Additionally, the margins of the forms containing the sprocket holes therein are connected to the main body of the forms by longitudinal tear lines 46. These margins are removed after the necessary data has been entered on the forms by the device 40. Since the strips 24 and 26 are likewise connected to the margins 18 and 20 of the units, the strips will automatically be removed from the units when the margins are removed therefrom. Thereafter, the layers comprising a unit may be distributed in the conventional manner.

Figure 4:
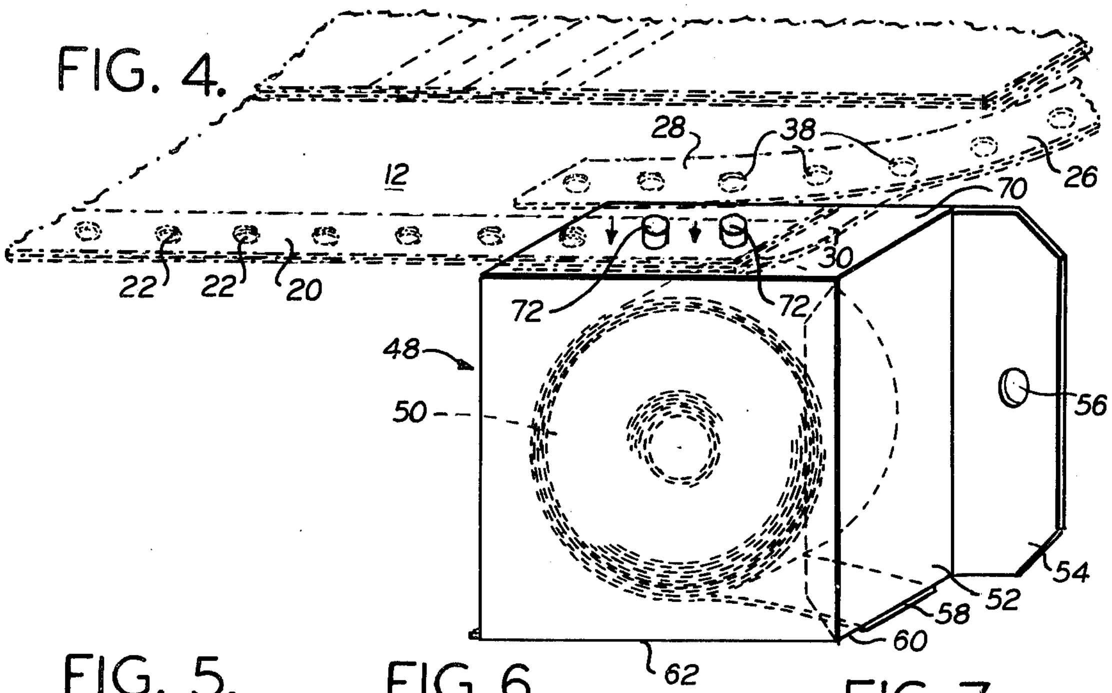
FIG. 4 is a perspective view of the dispenser shown in FIG. 3 as utilized to facilitate connection between the strips and the multiform units.

In accordance with the present invention, the strips 24 and 26 may form portions of a continuous roll which are dispensed by a suitable dispensing mechanism. Thus, as shown in FIGS. 3 and 4, an enclosure designated generally by the reference numeral 48 is provided which receives a continuous roll of strips 50. The enclosure 48 is a box-like device having a top flap 52 to permit closing of the box. Additionally, the rear wall is provided with an extension 54 having an opening 56 therein which is adapted to receive a hook on a display board or the like. A forward portion 58 of the roll 50 extends through an opening 60 between the top flap 52 and a side wall 62 of the enclosure. Additionally, the forward portion 58 of the roll 50 extends downwardly along the wall 62 through a channel 64 defined by the wall 62 and an overlying section 66. The bottom edge of the wall 62 may be provided with a serrated cutting edge 68. In operation, when it is desired to dispense a strip, the forward portion 58 of the roll 50 is grasped by the operator and pulled downwardly thereby unrolling the roll 50. When a sufficient length has been pulled out of the enclosure 48, the strip is moved backwardly against the cutting edge 68 to the phantom line position shown in FIG. 3. Pressure is then applied to cause the cutting edge to sever the strip from the remainder of the roll. The strip is then applied to the form in the manner noted above.

In order to facilitate connection and alignment of the strip with the form, the side wall 70 of the enclosure 48 may be provided with upstanding spaced projections 72. The projections 72 are spaced apart by a distance corresponding to the distance between sprocket holes 22 and 38. When connecting a strip such as strip 26 to margin 22 of the unit 12, the layer 30 is first engaged over the projection 72. Thereafter, the sprocket holes 22 in the margin 20 are placed over the projection 72. The layer 28 is then superimposed on the upper surface of the unit 12 so that the sprocket holes 38 in the layer 28 receive the projection 72 therein. Thereafter, pressure is applied to the composite unit comprising the layers of the strip 26 and the form 12 to connect together the strip and the form. The strip with the form connected thereto may then be removed from the projection 72. Accordingly, the projections 72 function to align the sprocket holes in the strip with the sprocket holes in the unit as the strip is connected thereto.

Figure 6:
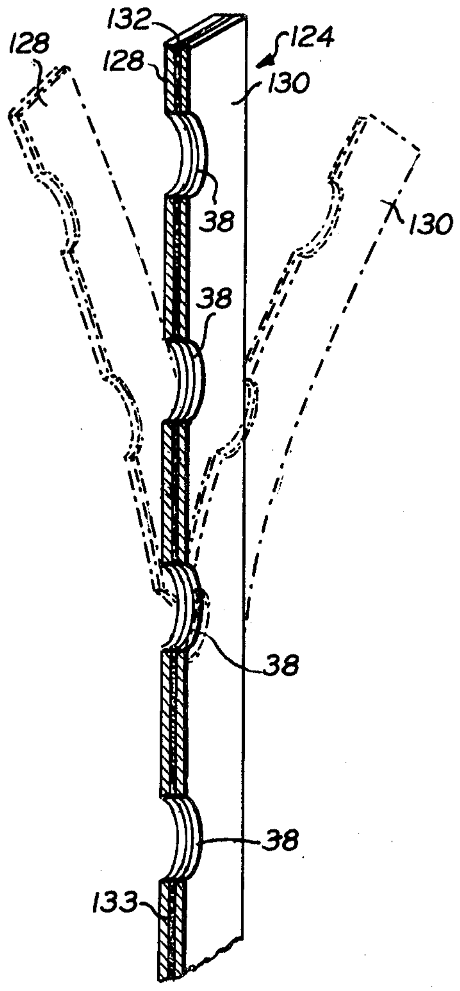
FIG. 6 illustrates a vertical sectional view of a modified embodiment of a strip forming a portion of the apparatus of the present invention.

A modified embodiment of a strip is designated by the reference character 124 in FIG. 6 and comprises an upper layer 128 and a lower layer 130. The layers 128 and 130 are connected along a portion of their length by an adhesive layer 132. That is, the layers 128 and 130 are connected together by said adhesive layer 132 for a length of approximately 3 sprocket holes 38. Thereafter, the layers 130 and 128 are connected together for the remainder of their length by an adhesive layer 133.

The adhesive layer 132 is of the type that permits the separation of the layers 128 and 130. However, the adhesive layer 133 forms a permanent bond so that the layers 128 and 130 may be peeled apart along adhesive layer 132 up to the adhesive layer 133. Thus, in operation, the layers 128 and 130 are separated up to the junction of said adhesive layers 132, 133 as indicated by the phantom line position of the layers in FIG. 6. The layers 128 and 130 are then connected to the form or unit 12 in the same manner as the respective layers 28 and 30 are connected thereto.

Figure 7:
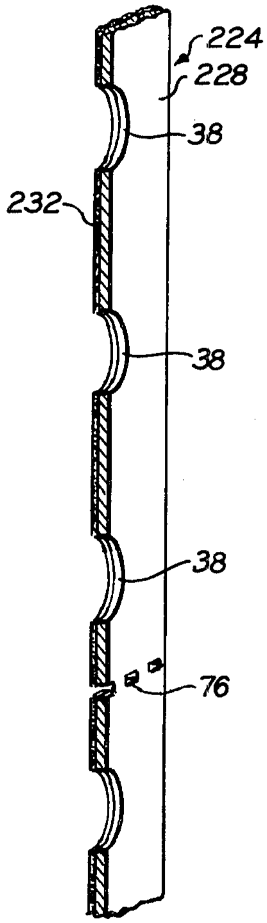
FIG. 7 is a vertical sectional view of a further modified embodiment of a strip constructed according to the present invention.

A further modified embodiment of a strip constructed according to the present invention is designated generally by the reference character 224 in FIG. 7. The strip 224 is a so-called single strip construction and comprises only a layer 228. An adhesive layer 232 is applied to the inner surface of the layer 228 so that the layer 228 may be connected to the unit 12. Additionally, the layer 228 may be formed of a continuous roll wherein individual strips in the roll are connected by a tear line 76 so that one strip may be separated from the other. The roll may be dispensed from an enclosure 48, in which case the cutting edge 68 may be eliminated.

Similar comments apply to the embodiments of FIGS. 5 and 6. That is, the embodiments of FIGS. 5 and 6 may be dispensed from an enclosure 48 as a continuous roll wherein the strips are interconnected along tear lines.

Accordingly, a method and an apparatus have been disclosed which permit the introduction of connected multiform units into a device and eliminate the necessity for voiding or wasting any of the units.

While preferred embodiments of the invention have been shown and described herein, it will become obvious that numerous omissions, changes and additions may be made in such embodiments without departing from the spirit and scope of the present invention.

What is claimed is:

1. A method for introducing connected multiform units of the type having spaced indexing holes on separable marginal tapes adjacent each marginal edge into a device of the type having indexing means for advancing said units to an operating station in said device, comprising:

providing a pair of lead strips having a width no wider than said separable marginal tapes with indexing holes having the same spacing as said indexing holes in said units, superimposing at least a portion of one of said pair of lead strips on one of said separable tapes of the first of said units with the indexing holes in said strip in overlapped and vertical alignment with the holes in said one tape, whereby the remaining portion of said lead strip extends beyond the leading edge of said first unit by a length sufficient to permit introduction of said units into the device;

and connecting said one of said pair of lead strips to said one tape by a pressure sensitive adhesive;

superimposing the other of said pair of lead strips on the other of said tapes of said first unit with the indexing holes in said strip in overlapped and vertical alignment with the holes in said other tape, whereby a portion of said other lead strip extends beyond the leading edge of said first unit by a length sufficient to permit introduction of said units into the device;

and connecting said other of said strips to said other tape by a pressure sensitive adhesive, whereby movement of said strips causes movement of said units.

2. The method of claim 1, comprising the further step of engaging the indexing holes in said strip with said indexing means, and advancing said indexing means to move said unit to said operating station.

3. The method of claim 1, in which said strip comprises an upper layer and a coextensive lower layer, and said method further comprises the step of connecting said upper layer to the upper surface of said units and connecting said lower layer to the lower surface of said units.

4. The method of claim 3, in which the upper and lower layers of said strip are releasably connected, said method comprising the further step of separating said upper and lower layers prior to affixing said layers to said units.

5. The method of claim 1, in which said strip is dispensed from a container having a continuous roll of strips, said method comprising the further step of separating a strip from the remainder of said roll prior to connecting said strip to said first unit.

6. Apparatus for introducing a package of connected forms into a device wherein the forms are of the type having separable marginal tapes having indexing holes engageable with sprocket wheel advancing means in the device for advancing the forms to an operating station, comprising: at least a strip having a single row of indexing holes therein, the width of said strip being no wider than the corresponding dimension of the tape, the spacing between said strip indexing holes being equal to the spacing between indexing holes in said tapes, said strip indexing holes being sized to be engaged by the sprocket wheel, and connecting means on said strip for connecting said strip to the tapes associated with the first form in said package or forms, said strip comprising an upper layer adapted to be connected to the upper surface of a tape of the first form, and a lower layer in overlying relationship to and coextensive with said upper layer and adapted to be connected to the lower surface of the tape, said upper and lower layers of said strip being separable along a first portion of the length of said strip, said first portion being substantially less than the overall length of said strip, means connecting together said upper and lower layers along the remainder of the length of said strip, and a pressure-sensitive adhesive on the facing surfaces of said first portion of said upper and lower layers of said strip, said pressure sensitive adhesive being adapted to be exposed only along said first portion.

7. Apparatus as in claim 6, and a plurality of strips in a continuous roll, and tear lines in said roll separating said plurality of strips into individual strips.

8. Apparatus as in claim 6, and a plurality of strips in a continuous roll, and dispensing means for dispensing individual strips from said roll, said dispensing means comprising an enclosed housing having a dispensing slot, said roll extending through said dispensing slot to provide for the removal of individual strips from said roll.

9. Apparatus as in claim 8, and a cutting edge on said housing for cutting individual strips from said roll.

10. Apparatus as in claim 8, and tear lines in said roll for separating said roll into individual ones of said plurality of strips.

11. Apparatus as in claim 8, and a pair of projections on said enclosure, the spacing between said projections being equal to the distance between said index holes, said pair of projections being sized to be received in said index holes to facilitate alignment and connection of said forms to said strip.

12. A method for introducing connected multiform units of the type having separable tapes of preselected width adjacent each margin and wherein the tapes have sprocket holes into a print-out device of the type having sprocket wheels engageable with said sprocket holes for advancing said units through said device as data is printed on said units at a printing station, said method comprising providing a strip having a width smaller than said preselected width with a row of sprocket holes having the same spacing as the sprocket holes in said units, superimposing respective portions of a pair of said strips on the first of said units so that the sprocket holes in each of said respective portions are in overlapping and vertical alignment with the holes in the tapes of said first unit, whereby the remaining portions of said strips extend beyond the leading edge of the first unit by a length sufficient to permit positioning of the first unit at the printing station, connecting said pair of strips to said first unit with pressure-sensitive adhesive whereby movement of said pair of strips causes concomitant movement of said units, and engaging said pair of strips with the sprocket wheels.

13. The method of claim 12, in which said strips comprise multilayer strips having at least an upper and a lower layer, said method comprising the further steps of connecting said upper layers of said strips to the upper surface of said first unit, and connecting the lower layers of said strips to the lower surface of said first unit so that said upper and lower layers are aligned with each other and receive said unit therebetween.

* * * * *